UNITED STATES PATENT OFFICE.

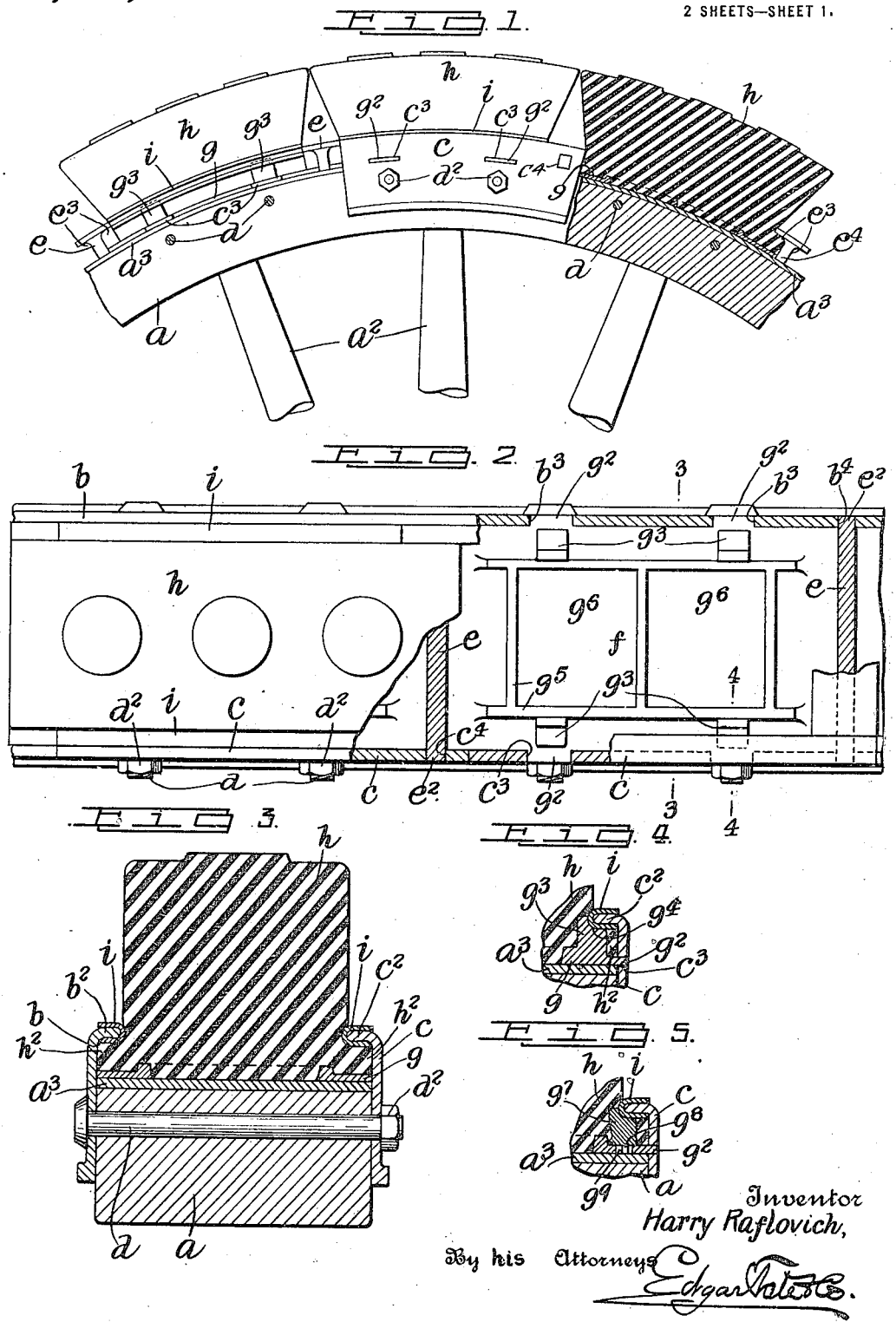

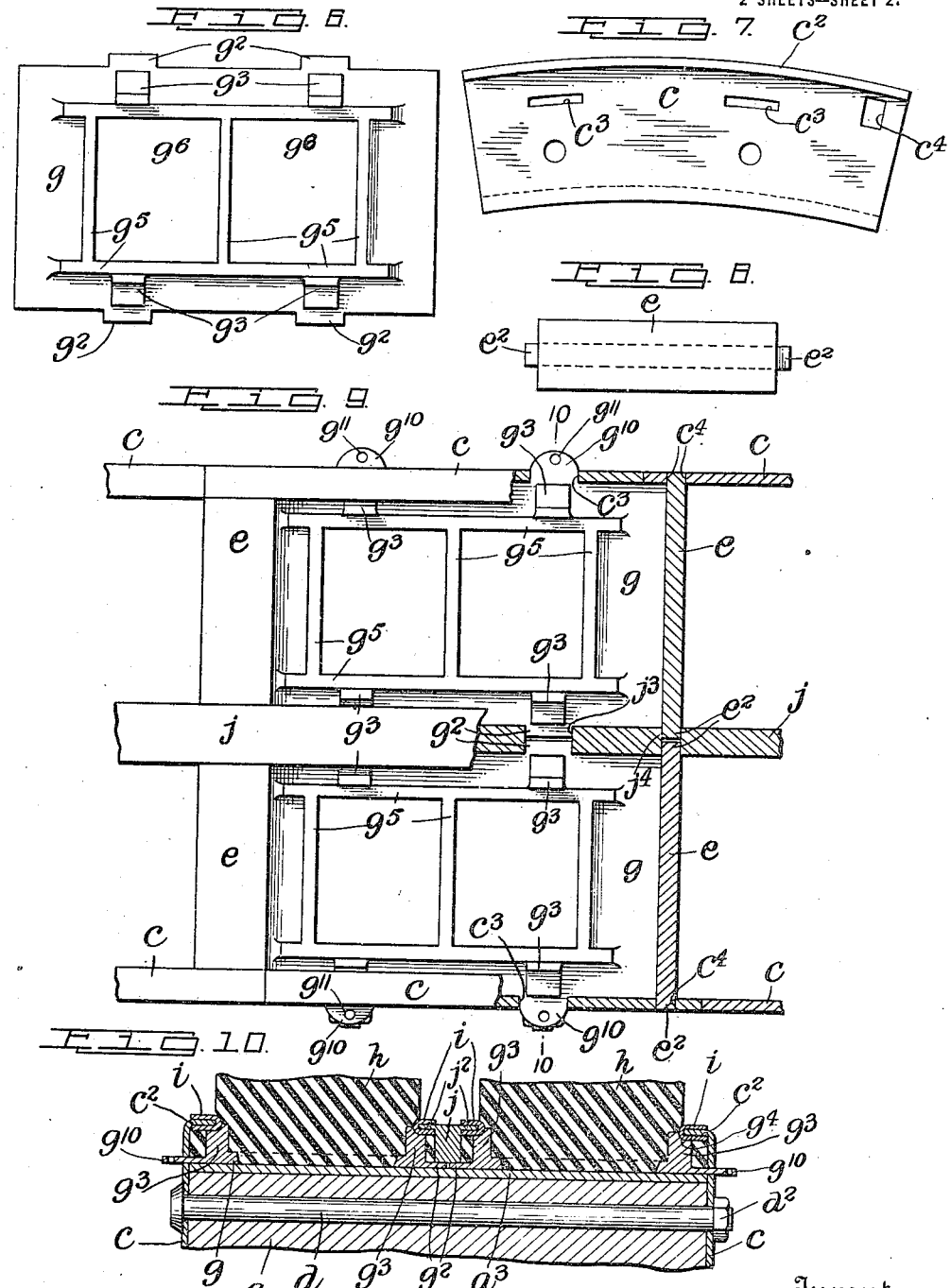

HARRY RAFLOVICH, OF NEW YORK, N. Y.

WHEEL RIM AND TIRE CONSTRUCTION.

1,252,839.

Specification of Letters Patent.

Patented Jan. 8, 1918.

Application filed June 30, 1916. Serial No. 106,786.

*To all whom it may concern:*

Be it known that I, HARRY RAFLOVICH, a citizen of the United States, and residing at New York, in the county of New York and State of New York, have invented certain new and useful Improvements in Wheel Rim and Tire Constructions, of which the following is a specification, such as will enable those skilled in the art to which it appertains to make and use the same.

This invention relates to wheel rim and tire constructions and especially to devices of this class in which the tire or tread member consists of separate blocks and means for or method of connecting said blocks with the rim, and the object of the invention is to provide a construction of this class which will be strong and durable and efficient in operation, and which facilitates the quick and easy repair whenever necessary; a further object being to provide a wheel rim and tire construction of the class specified in which the blocks may be used in a single row extending around the wheel or in two parallel rows whereby my improvement is adapted for use in connection with wheels of vehicles of moderate weight and also in connection with wheels of vehicles of the greatest weight; and with these and other objects in view the invention consists in the construction, combination and arrangement of parts hereinafter described.

The invention herein shown and described is an improvement on that described and claimed in U. S. Letters Patent No. 1,183,033 granted to me May 16, 1916, and is fully disclosed in the following specification, of which the accompanying drawings form a part, in which the separate parts of my improvement are designated by suitable reference characters in each of the views, and in which:—

Figure 1 is a sectional side view of a part of a wheel rim and tire construction made according to my invention and showing only a single tire or tread member;

Fig. 2 a face view of the construction shown in Fig. 1 partially in section and on an enlarged scale;

Fig. 3 a cross section on the line 3—3 of Fig. 2;

Fig. 4 a partial section on the line 4—4 of Fig. 2;

Fig 5 a view similar to Fig. 4 but showing a modification;

Fig. 6 a plan view of a tire block plate which I employ;

Fig. 7 an inside view of an outer tire plate which I employ;

Fig. 8 a plan view of a spacing plate which I employ;

Fig. 9 a view similar to Fig. 2 but showing the double tread or tire construction and with the elastic tire blocks removed; and, Fig. 10 a cross section on the line 10—10 of Fig. 9 with part of the construction broken away.

In the drawing forming part of this specification, I have shown at $a$ an ordinary wheel rim preferably composed of wood and with which the spokes $a^2$ are connected. Mounted on the rim $a$ is an annular rim band $a^3$ which is secured to the rim $a$ in the usual or any preferred manner and, in the practice of my invention, as shown in Figs. 1 to 3 inclusive, I provide the inner side of the rim of the wheel with an annular side plate $b$ which extends entirely around the rim and the outer edge of which is provided with an inwardly directed flange $b^2$.

The outer side of the rim is provided with a plurality or series of tire plates $c$ which abut against each other and which extend entirely around the rim and are provided at their outer edges with inwardly directed flanges $c^2$, and the inner annular plate $b$ and the separate outer tire plates $c$ are secured to the rim $a$ by bolts $d$ passed transversely therethrough and provided at their outer ends with nuts $d^2$.

The outer tire plates $c$ are each provided adjacent to the outer edges thereof with spaced elongated apertures $c^3$ and adjacent to one outer corner portion thereof with another oblong aperture $c^4$, and the inner annular side plate $b$ is provided with similar spaced apertures $b^3$ and $b^4$ which are in alinement with the apertures $c^3$ and $c^4$ in the plates $c$. Placed between the separate side plates $b$—$c$ are a plurality of spacing plates $e$ which are T-shaped in form in cross section as shown in Fig. 1, and the web portion of which is extended at the opposite sides thereof to form projecting lug members $e^2$ which are adapted to fit in the apertures $b^4$ and $c^4$ in the plates $b$—$c$, and the top of said plates form at the opposite sides thereof between said top and the rim band $a^3$ recessed spaces $e^3$.

The side plates $b$—$c$ with the spacing plates $e$ therebetween divide the outer surface of the rim of the wheel into rectangular tire block spaces $f$ in which are placed tire block plates $g$, the dimensions of which correspond with the dimensions between said side plates $b$—$c$, and the parts $e^4$ of the spacing plates $e$ and said tire block plates are provided on the opposite sides thereof with lugs or projections $g^2$ which are adapted to enter the apertures $b^3$ and $c^3$ in the plates $b$—$c$, as clearly shown in Figs. 2, 4 and 5, and said plates are provided inwardly of said lugs or projections with integral raised blocks $g^3$, the top outer side portions of which are recessed as shown at $g^4$ in Fig. 4, and the outer faces of the plates $g$ are preferably provided with longitudinal and transverse ribs $g^5$ between which are formed rectangular apertures $g^6$.

Mounted in connection with the tire block plates $g$ are tire blocks $h$ similar in form to other blocks of this class, and provided with base flanges $h^2$ in connection with which the inwardly directed flanges $b^2$ and $c^2$ of the plates $b$—$c$ operate, and placed between the flanges $b^2$—$c^2$ and the tire block $h$, are U-shaped strips $i$ which operate to prevent the breaking of said blocks where the flanges $b^2$ and $c^2$ engage the same, and the flanges $h^2$ at the ends of the blocks $h$ are adapted to enter the recessed spaces $e^3$ formed by the spacing plates $e$, and as shown in Fig. 4 the U-shaped strips $i$ are adapted to fit in the grooves $g^4$ in the top outer corner portions of the blocks $g^3$, whereby the strain exerted on said strips $i$ is sustained by said blocks.

In Fig. 5 of the drawing, I have shown a modified form of construction which consists in mounting detachable blocks $g^7$ in connection with the plates $g$, and in the same relative positions as the integral blocks $g^3$, said detachable blocks $g^7$ being provided at the bottom thereof with pins $g^8$ which operate in elongated slots $g^9$ in the plates $g$, and with this construction the blocks $g$ will serve to support the strips $i$, but will be free to move transversely of the tire, or the blocks thereof, to a slight extent, and thereby produce a yielding support for the strips $i$.

In the construction shown in Figs. 9 and 10, a wider rim is employed and mounted on the rim band $a^3$ is a central annular rib member $j$ which is T-shaped in cross section as shown in Fig. 10, and provided at the opposite sides thereof with flanges $j^2$, and the annular rib member is provided at intervals with apertures $j^3$ which correspond with the apertures $b^3$ and $c^3$, and the plates $b$ and $c$ in the construction shown in Figs. 1 to 8 inclusive, but in the form of construction shown in Figs. 9 and 10, the rim $a$ is provided on the inner and outer sides thereof with a plurality or series of tire plates $c$ which abut against each other, and said plates are similar in all respects to the plates $c$ shown in Figs. 1 to 3 inclusive, and in detail in Fig. 7, and with this construction I also employ the spacing plates $e$, the projecting lug members $e^2$ of which operate in connection with the apertures $c^4$ in the plates $c$ and in connection with apertures $j^4$ in the central web member $j$, said apertures $j^4$ being in alinement with the apertures $c^4$ as will be readily understood.

The above construction divides the outer surface of the rim of the wheel into two parallel rows of rectangular spaces in which tire blocks plates $g$ are adapted to be placed, said plates $g$ being similar in all respects to those shown in Figs. 1 to 3 inclusive, and in detail in Fig. 6 with the exception that each of said plates is provided on one side thereof with lug members $g^{10}$ which are longer than the lug members $g^2$ on the other side thereof, and said lug projections $g^{10}$ are adapted to be passed through the apertures $c^3$ in the plate $c$ and project beyond said plates and are provided with apertures $g^{11}$ whereby chains or other anti-skid devices may be passed around the blocks or tread members $h$, and connected with said lugs, as will be readily understood, the other details of construction of the separate parts of the rim and tire construction, as shown in Figs. 9 and 10 are the same as the construction shown in Figs. 1 to 8 inclusive, and the operation of assembling the various parts of my improvement in each form of construction will be as follows.

In applying my improvement to the rim $a$, with the band member $a^3$ thereon, as shown in Figs. 1 to 3 inclusive, the inner annular side plate $b$ is first applied thereto, and the bolts $d$ passed therethrough and through the rim $a$, after which the spacing plates $e$ are connected with the side plate $b$ by placing the projecting lug members $e^2$ thereof in the apertures $b^4$ in the plate $b$, after which the tire block plates $g$ with the tire blocks $h$ connected therewith are inserted into the spaces $f$ and the lug members $g^2$ thereof are placed in the apertures $b^3$ of said side plate, after which the separate tire plates $c$ are placed in position and secured therein by nuts $d^2$ on the bolts $d$, it being understood that the U-shaped strips $i$ are connected with the flanges $b^2$ and $c^2$ of the plates $b$ and $c$ when the tire block $h$ is placed in position.

In assembling the various parts of my improvement as shown in Figs. 9 and 10, the spacing plates $e$ are first connected with the central annular web member $j$, after which the tire plates $g$ with the blocks $h$ connected therewith are placed in position, after which the separate tire plates $c$ are connected with the opposite sides of the rim, it being understood that the inner side of the rim is the first to be assembled.

With my improved wheel rim and tire construction, the tire blocks h may be quickly and easily replaced and, in the event of the breaking of any of the separate parts of the tire block supporting means, such as the parts b, c, e, and g, such broken part may be replaced without material cost and this, in practice, is found to be of great value, as such devices are subject to great strain and when broken the cost of repairing the same is not justifiable, in view of the cost of obtaining a new tire supporting means, and it will be understood that my invention is not limited to the exact form, construction and arrangements of parts herein shown and described, and changes therein and modifications thereof may be made, within the scope of the appended claims, without departing from the spirit of my invention or sacrificing its advantages.

Having fully described my invention, what I claim as new and desire to secure by Letters Patent, is:—

1. In a wheel rim and tire construction, a rim, an inner annular side plate member the periphery of which is provided with an inwardly directed annular flange, an outer annular side plate member composed of separate parts, the periphery of said separate parts being provided with an inwardly directed flange, transverse plate members independent of and detachably connected with said inner and outer side plate members and being T-shaped in cross section to form in the opposite sides thereof recessed spaces, said transverse plate members dividing the periphery of the rim into a plurality of spaces, tire blocks mounted in said spaces and provided with side and end base flanges, the end flanges of which are adapted to enter said recessed spaces in said transverse members and the side flanges of which are adapted to be engaged by the flanges of the inner and outer side plate members, and bolts passed through said side plate members to lock said transverse plate members therebetween.

2. In a wheel rim and tire construction, a rim, an inner annular side plate member the periphery of which is provided with an inwardly directed annular flange, an outer annular side plate member composed of separate parts, the periphery of said separate parts being provided with an inwardly directed flange, transverse plate members detachably connected with said inner and outer side plate members and being T-shaped in cross section to form in the opposite sides thereof recessed spaces, said transverse plate members dividing the periphery of the rim into a plurality of spaces, tire blocks mounted in said spaces and provided with side and end base flanges, the end flanges of which are adapted to enter said recessed spaces in said transverse members and the side flanges of which are adapted to be engaged by the flanges of the inner and outer side plate members, and tire block plates mounted in connection with said tire blocks and detachably connected with said inner and outer side plate members.

3. In a wheel rim and tire construction, a rim, an inner annular side plate member the periphery of which is provided with an inwardly directed annular flange, an outer annular side plate member composed of separate parts, the periphery of said separate parts being provided with an inwardly directed flange, transverse plate members detachably connected with said inner and outer side plate members and being T-shaped in cross section to form in the opposite sides thereof recessed spaces, said transverse plate members dividing the periphery of the rim into a plurality of spaces, tire blocks mounted in said spaces and provided with side and end base flanges, the end flanges of which are adapted to enter said recessed spaces in said transverse members and the side flanges of which are adapted to be engaged by the flanges of the inner and outer side plate members, tire block plates mounted in connection with said tire blocks and detachably connected with said inner and outer side plate members, said tire block plates being provided in the opposite sides thereof with spaced raised lug members, and U-shaped strips mounted in connection with the flanges of the inner and outer annular side plate members, said strips being adapted to be supported by the raised lug members on said tire block plates.

4. In a wheel rim and tire construction, a rim, a tire supporting means composed of a plurality of parts detachably connected with each other and with said rim, and comprising side plate members, transverse spacing members independent of said side plate members and tire block plates, said parts when secured together forming a plurality of spaces on the periphery of the wheel, and tire blocks supported in said spaces by said parts.

5. In a wheel rim and tire construction, a rim, a tire supporting means composed of a plurality of parts detachably connected with each other and with said rim, and comprising side plate members, transverse spacing members independent of said side plate members and tire block plates, said parts when secured together forming a plurality of spaces on the periphery of the wheel, said tire block plates being provided with raised portions and tire blocks supported in said spaces by said parts and provided with recesses to receive the raised portions on said tire block plates.

6. In a wheel rim and tire construction, a tire supporting means composed of a plurality of detachably connected parts comprising side plate members, transverse spacing members independent of said side plate members and tire block plates, means for securing said side plate members with the transverse spacing members therebetween to said rim, and tire blocks supported in said spaces and by said parts.

7. In a wheel rim and tire construction, a rim, a tire supporting means composed of a plurality of detachably connected parts comprising side plate members, transverse spacing members and tire block plates, said tire block plates being provided on the opposite sides thereof with projecting members, said side plate members being provided with apertures in connection with which said projecting members operate, said transverse spacing members being provided at the ends thereof with projections and said side plate members being provided with other apertures in connection with which the projections of the transverse spacing members operate.

8. In a wheel rim and tire construction, a rim, a tire supporting means composed of a plurality of detachably connected parts comprising side plate members, transverse spacing members and tire block plates, the top of said tire block plates being provided with raised portions and the opposite sides thereof with projections, said side plate members being provided with apertures to receive the projections of said tire block plates to interlock the same, means for securing said side plate members, tire block plates and spacing members to the rim to form a plurality of spaces on the periphery of the wheel, and tire blocks supported in said spaces by said parts and provided with recesses to receive the raised portions of said tire block plates.

9. In a wheel rim and tire construction, a rim, a tire supporting means composed of a plurality of parts detachably connected with each other and with said rim and comprising side plate members the periphery of which are provided with inwardly directed flanges, transverse spacing members provided with oppositely directed flanges and tire block plates, said parts when secured together forming a plurality of spaces on the periphery of the wheel, said tire block plates being provided with raised portions, tire blocks supported in said spaces and by said parts and provided with recesses to receive the raised portions on said tire block plates, said tire block plates being provided on the top thereof with raised blocks which are countersunk in said tire blocks and U-shaped strips mounted in connection with the flanges of the side plate members and adapted to be supported by said blocks on the tire block plates.

10. In a wheel rim and tire construction, a rim, a tire supporting means composed of a plurality of parts detachably connected with each other and with said rim and comprising side plate members and transverse spacing members independent of said side plate members, said parts when secured together forming a plurality of spaces on the periphery of the wheel one of said side plate members being composed of a plurality of parts, and means on said side plate members and said transverse spacing members for supporting tire blocks in said spaces.

In testimony that I claim the foregoing as my invention I have signed my name in presence of the subscribing witnesses this 28th day of June 1916.

HARRY RAFLOVICH.

Witnesses:
C. E. MULREANY,
N. E. THOMPSON.

Copies of this patent may be obtained for five cents each, by addressing the "Commissioner of Patents, Washington, D. C."